(12) United States Patent
Zhang et al.

(10) Patent No.: US 10,172,003 B2
(45) Date of Patent: Jan. 1, 2019

(54) COMMUNICATION SECURITY PROCESSING METHOD, AND APPARATUS

(71) Applicant: HUAWEI TECHNOLOGIES CO., LTD., Shenzhen (CN)

(72) Inventors: Hongping Zhang, Shanghai (CN); Tao Zhong, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 172 days.

(21) Appl. No.: 14/743,193

(22) Filed: Jun. 18, 2015

(65) Prior Publication Data

US 2015/0319618 A1 Nov. 5, 2015

Related U.S. Application Data

(63) Continuation of application No. PCT/CN2012/086930, filed on Dec. 19, 2012.

(51) Int. Cl.
*H04W 12/08* (2009.01)
*H04W 48/12* (2009.01)
(Continued)

(52) U.S. Cl.
CPC ........... *H04W 12/08* (2013.01); *H04W 12/04* (2013.01); *H04W 12/06* (2013.01);
(Continued)

(58) Field of Classification Search
CPC .................................................... H04W 12/08
See application file for complete search history.

(56) References Cited

U.S. PATENT DOCUMENTS

2005/0122941 A1   6/2005   Wu et al.
2007/0249352 A1*  10/2007  Song ....................... H04L 63/08
                                                        455/436
(Continued)

FOREIGN PATENT DOCUMENTS

CN    1615040      5/2005
CN    101635923    1/2010
(Continued)

OTHER PUBLICATIONS

*3rd Generation Partnership Project; Technical Specification Group Services and System Aspects; Architecture enhancements for non-3GPP accesses (Release 11)*, 3GPP TS 23.402 v11.4.0 (Sep. 2012), $3^{rd}$ Generation Partnership Project, Sep. 2012, pp. 1-258.
(Continued)

*Primary Examiner* — Jason E Mattis
(74) *Attorney, Agent, or Firm* — Staas & Halsey LLP

(57) ABSTRACT

The present invention provides a communication security processing method and an apparatus. The communication security processing method includes: determining, by a base station, that user equipment UE needs to access an access point AP; acquiring, by the base station, a security parameter that is required for the UE to interact with the AP; after an air interface is securely activated, sending, by the base station, the security parameter to the UE, so that the UE performs, by using the security parameter, security processing on data exchanged between the UE and the AP. According to the communication security processing method and the apparatus that are provided in the present invention, a security air interface between UE and a base station is used to transfer a security-related parameter, which improves data communication security, and enhances network control performed by an operator.

17 Claims, 10 Drawing Sheets

(51) Int. Cl.
    *H04W 12/06*    (2009.01)
    *H04W 12/04*    (2009.01)
    *H04W 36/00*    (2009.01)
    *H04W 92/10*    (2009.01)
    *H04W 88/02*    (2009.01)
    *H04W 88/08*    (2009.01)
    *H04W 36/14*    (2009.01)

(52) U.S. Cl.
    CPC ....... *H04W 36/0038* (2013.01); *H04W 48/12* (2013.01); *H04W 36/0016* (2013.01); *H04W 36/14* (2013.01); *H04W 88/02* (2013.01); *H04W 88/08* (2013.01); *H04W 92/10* (2013.01)

(56) References Cited

U.S. PATENT DOCUMENTS

| | | | |
|---|---|---|---|
| 2011/0222523 A1 | 9/2011 | Fu et al. | |
| 2011/0235802 A1 | 9/2011 | Kokkinen et al. | |
| 2013/0088983 A1* | 4/2013 | Pragada | H04W 16/14 370/252 |
| 2014/0310523 A1* | 10/2014 | Zhang | H04W 12/10 713/168 |
| 2015/0181491 A1* | 6/2015 | Van Phan | H04W 28/08 370/331 |
| 2015/0296440 A1* | 10/2015 | Forssell | H04W 48/08 370/329 |

FOREIGN PATENT DOCUMENTS

| | | |
|---|---|---|
| CN | 102318237 A | 1/2012 |
| WO | 2009/123074 A1 | 10/2009 |

OTHER PUBLICATIONS

"Security context transfer for handover between 3GPP and trusted non 3GPP networks," 3GPP TSG SA WG2 Architecture—S2#57, S2-071821, 3$^{rd}$ Generation Partnership Project, Beijing, China, Apr. 23-27, 2007, 6 pages.

Extended European Search Report dated Nov. 20, 2015 in corresponding European Patent Application No. 12890423.2.

PCT International Search Report dated Sep. 26, 2013 in corresponding International Patent Application No. PCT/CN2012/086930.

International Search Report dated Sep. 26, 2013 in corresponding International Patent Application No. PCT/CN2012/086930.

Chinese Office Action dated Apr. 4, 2018 in related Chinese Patent Application No. 201280029681.3 (8 pages).

* cited by examiner

COMMUNICATION SECURITY PROCESSING METHOD, AND APPARATUS

CROSS-REFERENCE TO RELATED APPLICATIONS

This application is a continuation of International Application No. PCT/CN2012/086930, filed on Dec. 19, 2012, which is hereby incorporated by reference in its entirety.

TECHNICAL FIELD

Embodiments of the present invention relate to communications technologies, and in particular, to a communication security processing method and an apparatus.

BACKGROUND

In recent years, with the rapid development of communications technologies, an air interface throughput rate of a network has been increasing continuously; however, because a quantity of users has been increasing gradually and data services have also been growing continuously, load of a communications network is increasingly heavy, which often causes network congestion. In this case, it is difficult to ensure the user communication quality.

To relieve congestion of a communications network, a network operator chooses a data offloading manner to offload some data on a communications network to other available access technologies, so as to implement supplement to the communications network. A Wireless Fidelity (Wireless Fidelity, WiFi for short) technology is one of the access technologies. The WiFi technology is characterized by a cost-free spectrum, a high air interface throughput rate and low device costs, and therefore, by using the WiFi technology to perform data offloading, an air interface throughput rate can be greatly increased and network construction costs can be reduced.

However, in the prior art, security of data transmission between user equipment (User Equipment, UE for short) and a WiFi access point (Access Point, AP for short) is relatively low, and therefore, communication security is threatened.

SUMMARY

Embodiments of the present invention provide a communication security processing method and an apparatus, where a security air interface between UE and a base station is used to transfer a security-related parameter, so as to improve data communication security.

A first aspect of the embodiments of the present invention provides a communication security processing method, including:

determining, by a base station, that user equipment UE needs to access an access point AP;

acquiring, by the base station, a security parameter that is required for the UE to interact with the AP; and after an air interface is securely activated, sending, by the base station, the security parameter to the UE, so that the UE performs, by using the security parameter, security processing on data exchanged between the UE and the AP.

With reference to the first aspect, in a first possible implementation manner, the determining, by a base station, that UE needs to access an AP includes:

determining, by the base station according to a preset offloading policy, that the UE needs to access the AP; or receiving, by the base station, a request message that is for accessing the AP and is sent by the UE, and determining, according to the request message, that the UE needs to access the AP.

With reference to the first aspect, in a second possible implementation manner, the acquiring, by the base station, a security parameter that is required for the UE to interact with the AP includes:

generating, by the base station, the security parameter; and the method further includes:

sending, by the base station, the security parameter to the AP.

With reference to the first aspect, in a third possible implementation manner, the acquiring, by the base station, a security parameter that is required for the UE to interact with the AP includes:

sending, by the base station, an access request to the AP; and receiving, by the base station, an access response that includes the security parameter generated by the AP and is sent by the AP.

With reference to the first aspect, in a fourth possible implementation manner, the acquiring, by the base station, a security parameter that is required for the UE to interact with the AP includes:

sending, by the base station, an access information request that includes an AP identifier to a mobility management entity MME; and receiving, by the base station, the security parameter that is corresponding to the AP identifier and is sent by the MME; and the method further includes:

sending, by the base station, the security parameter to the AP.

A second aspect of the embodiments of the present invention provides a communication security processing method, including:

receiving, by UE, a security parameter that is required for the UE to interact with the AP and is sent by a base station after an air interface is securely activated; and performing, by the UE by using the security parameter, security processing on data exchanged between the UE and the AP.

With reference to the second aspect, in a first possible implementation manner, before the receiving, by UE, a security parameter that is required for the UE to interact with the AP and is sent by a base station after an air interface is securely activated, the method further includes:

sending, by the UE, a request message for accessing the AP to the base station, so that the base station determines, according to the request message, that the UE needs to access the AP.

A third aspect of the embodiments of the present invention provides a communication security processing method, including:

receiving, by an access point AP, an access request that is used for user equipment UE to access the AP and is sent by a base station;

acquiring, by the AP, a security parameter that is required for the AP to interact with the UE;

sending, by the AP, an AP access response to the base station; and after the UE accesses the AP, performing, by the AP by using the security parameter, security processing on data exchanged between the AP and the UE.

With reference to the third aspect, in a first possible implementation manner, the acquiring, by the AP, a security parameter that is required for the AP to interact with the UE includes:

generating, by the AP, the security parameter; or receiving, by the AP, the security parameter sent by a mobility management entity MME; and the sending, by the AP, an AP access response to the base station includes:

sending, by the AP, the AP access response that includes the security parameter to the base station.

With reference to the third aspect, in a second possible implementation manner, the acquiring, by the AP, a security parameter that is required for the AP to interact with the UE includes:

receiving, by the AP, the security parameter sent by the base station.

A fourth aspect of the embodiments of the present invention provides a communication security processing method, including:

receiving, by a mobility management entity MME, an access information request that includes an access point AP identifier and is sent by a base station;

acquiring, by the MME, a security parameter corresponding to the AP identifier; and sending, by the MME, the security parameter to the base station, so that the base station sends the security parameter to UE.

With reference to the fourth aspect, in a first possible implementation manner, the acquiring, by the MME, a security parameter corresponding to the AP identifier includes:

acquiring, by the MME from a home subscriber server HSS, the security parameter corresponding to the AP identifier; or generating, by the MME, the security parameter corresponding to the AP identifier; and the method further includes:

sending, by the MME, the security parameter to the AP.

A fifth aspect of the embodiments of the present invention provides a base station, including:

a determining module, configured to determine that user equipment UE needs to access an access point AP;

an acquiring module, configured to acquire a security parameter that is required for the UE to interact with the AP; and a sending module, configured to: after an air interface is securely activated, send the security parameter to the UE, so that the UE performs, by using the security parameter, security processing on data exchanged between the UE and the AP.

With reference to the fifth aspect, in a first possible implementation manner, the determining module is specifically configured to:

determine, according to a preset offloading policy, that the UE needs to access the AP; or determine, according to a request message that is for accessing the AP and is sent by the UE, that the UE needs to access the AP.

With reference to the fifth aspect, in a second possible implementation manner, the acquiring module includes:

a generating unit, configured to generate the security parameter; and the sending module is further configured to send the security parameter to the AP.

With reference to the fifth aspect, in a third possible implementation manner, the acquiring module includes:

a first sending unit, configured to send an access request to the AP; and a first receiving unit, configured to receive an access response that includes the security parameter generated by the AP and is sent by the AP.

With reference to the fifth aspect, in a fourth possible implementation manner, the acquiring module includes:

a second sending unit, configured to send an access information request that includes an AP identifier to a mobility management entity MME; and a second receiving unit, configured to receive the security parameter that is corresponding to the AP identifier and is sent by the MME; and the sending module is further configured to send the security parameter to the AP.

A sixth aspect of the embodiments of the present invention provides user equipment UE, including:

a receiving module, configured to receive a security parameter that is required for the UE to interact with the AP and is sent by a base station after an air interface is securely activated; and a processing module, configured to perform, by using the security parameter, security processing on data exchanged between the UE and the AP.

With reference to the sixth aspect, in a first possible implementation manner, the UE further includes:

a sending module, configured to: before the security parameter that is required for the UE to interact with the AP and is sent by the base station after the air interface is securely activated is received, send a request message for accessing the AP to the base station, so that the base station determines, according to the request message, that the UE needs to access the AP.

A seventh aspect of the embodiments of the present invention provides an access point AP, including:

a receiving module, configured to receive an access request that is used for user equipment UE to access the AP and is sent by a base station;

an acquiring module, configured to acquire a security parameter that is required for the AP to interact with the UE;

a sending module, configured to send an AP access response to the base station; and a processing module, configured to: after the UE accesses the AP, perform, by using the security parameter, security processing on data exchanged between the AP and the UE.

With reference to the seventh aspect, in a first possible implementation manner, the acquiring module is specifically configured to generate the security parameter, or receive, by the AP, the security parameter sent by a mobility management entity MME; and the sending module is specifically configured to send the AP access response that includes the security parameter.

With reference to the seventh aspect, in a second possible implementation manner, the acquiring module is further configured to receive the security parameter sent by the base station.

An eighth aspect of the embodiments of the present invention provides a mobility management entity MME, including:

a receiving module, configured to receive an access information request that includes an access point AP identifier and is sent by a base station;

an acquiring module, configured to acquire a security parameter corresponding to the AP identifier; and a sending module, configured to send the security parameter to the base station, so that the base station sends the security parameter to UE.

With reference to the eighth aspect, in a first possible implementation manner, the acquiring module is specifically configured to acquire, from a home subscriber server HSS, the security parameter corresponding to the AP identifier, or the MME is configured to generate the security parameter corresponding to the AP identifier; and the sending module is further configured to send the security parameter to the AP.

According to the communication security processing method and the apparatus in the present invention, a base station acquires a security parameter that is used for UE to interact with an AP, and transfers the security parameter required for communication security over a security air interface between the base station and the UE; the UE accesses the AP by using the acquired security parameter, and performs security processing on data exchanged between the UE and the AP, which can improve security of interaction between the UE and the AP, and ensure data communication security.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
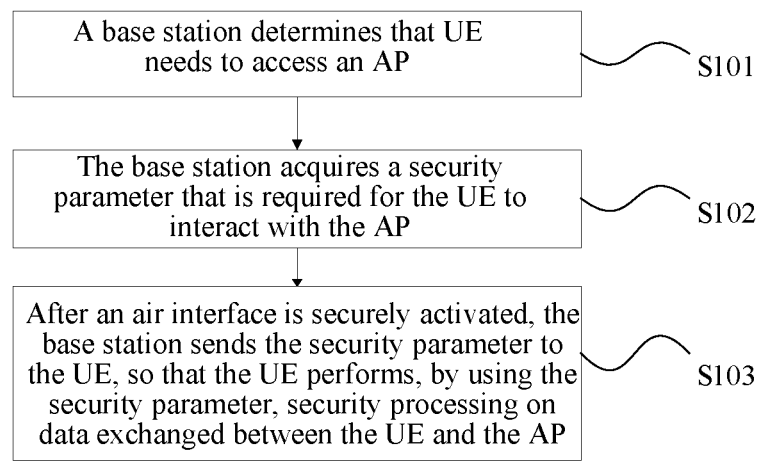
FIG. 1 is a schematic flowchart of Embodiment 1 of a communication security processing method according to the present invention.

FIG. 1 is a schematic flowchart of Embodiment 1 of a communication security processing method according to the present invention. As shown in FIG. 1, the method includes the following steps:

S101: A base station determines that UE needs to access an AP.

S102: The base station acquires a security parameter that is required for the UE to interact with the AP.

S103: After an air interface is securely activated, the base station sends the security parameter to the UE, so that the UE performs, by using the security parameter, security processing on data exchanged between the UE and the AP.

Specifically, the base station determines that the UE needs to access the AP, and the base station acquires the security parameter that is required for the UE to interact with the AP. After the security air interface between the base station and the UE is activated, that is, after a security mode command (Security Mode Command, SMC for short) process, security protection such as encryption is performed on data transmitted between the base station and the UE. Then, the base station sends the acquired security parameter to the UE by using a message, so as to ensure that the UE can access the AP by using the security parameter; and after the UE accesses the AP, the UE can perform, by using the security parameter sent by the base station, security processing on the data exchanged between the UE and the AP, that is, can perform encryption and/or decryption processing on the data.

In the method provided in this embodiment, a base station acquires a security parameter that is required for UE to interact with an AP, and transfers the security parameter required for communication security over a security air interface between the base station and the UE; the UE accesses the AP by using the acquired security parameter, and performs security processing on data exchanged between the UE and the AP, which can improve security of interaction between the UE and the AP, and ensure data communication security.

Figure 2:
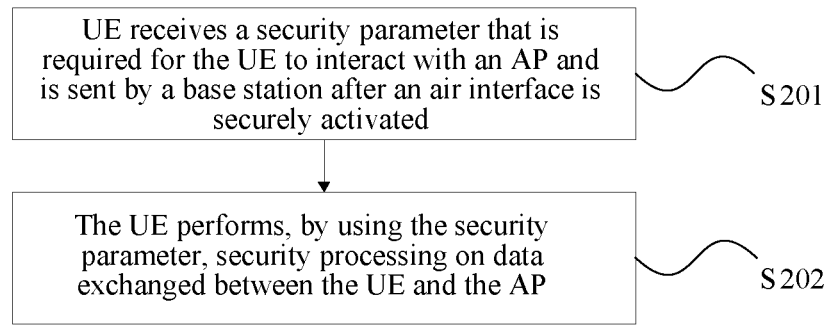
FIG. 2 is a schematic flowchart of Embodiment 2 of a communication security processing method according to the present invention.

FIG. 2 is a schematic flowchart of Embodiment 2 of a communication security processing method according to the present invention. As shown in FIG. 2, the method includes the following steps:

S201: UE receives a security parameter that is required for the UE to interact with an AP and is sent by a base station after an air interface is securely activated.

S202: The UE performs, by using the security parameter, security processing on data exchanged between the UE and the AP.

Specifically, the UE receives, over the air interface between the UE and the base station, the security parameter acquired by the base station. In this case, the air interface between the base station and the UE is securely activated. That is, after an SMC process, security protection such as encryption is performed on data transmitted between the base station and the UE; therefore, the air interface is secure, and transfer of the security parameter is also secure and confidential. After receiving the security parameter, the UE accesses the AP by using the security parameter, and performs security processing on the data exchanged between the UE and the AP, that is, can perform encryption and/or decryption processing on the data exchanged between the UE and the AP.

In the method provided in this embodiment, UE receives, over a security air interface, a security parameter that is required for the UE to interact with an AP and is acquired by a base station, accesses the AP by using the received security parameter, and performs security processing on data exchanged between the UE and the AP, which can improve security of interaction between the UE and the AP, and ensure data communication security.

Figure 3:
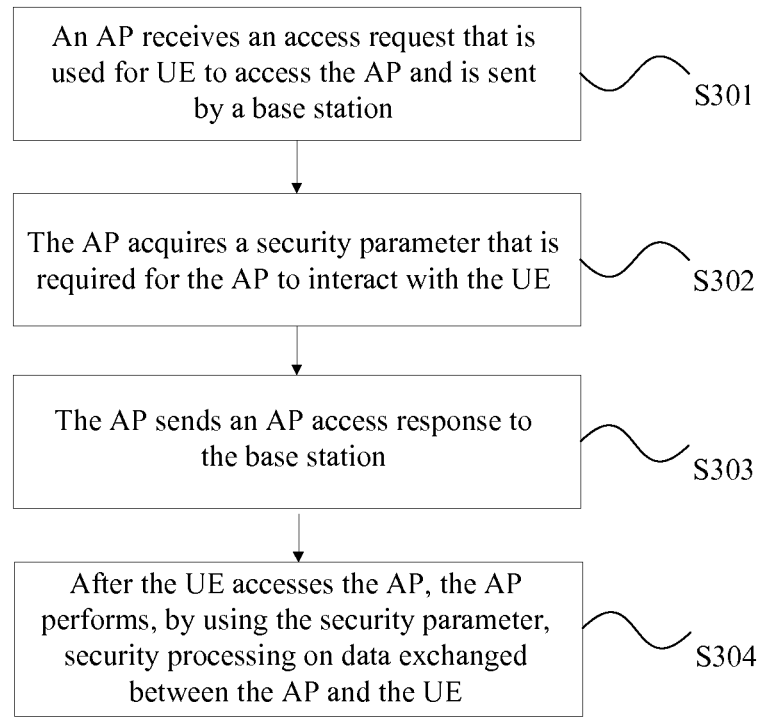
FIG. 3 is a schematic flowchart of Embodiment 3 of a communication security processing method according to the present invention.

FIG. 3 is a schematic flowchart of Embodiment 3 of a communication security processing method according to the present invention. As shown in FIG. 3, the method includes the following steps:

S301: An AP receives an access request that is used for UE to access the AP and is sent by a base station.

Optionally, the UE requests to access the AP, and sends the request for accessing the AP to the base station; after receiving the request that is used for the UE to access the AP, the base station sends the access request to the AP over an interface (a wired interface, for example, an optical fiber) between the base station and the AP; and the AP receives the access request.

S302: The AP acquires a security parameter that is required for the AP to interact with the UE.

S303: The AP sends an AP access response to the base station.

Specifically, after the AP receives the request that is used for the UE to access the AP and is sent by the base station, the AP acquires the security parameter that is required for the UE to access the AP and interact with the AP, and saves the security parameter; then, the AP sends the AP access response to the base station over the interface between the base station and the AP. Optionally, the access response may carry the security parameter. After receiving the access response sent by the AP, the base station sends, to the UE over an air interface between the base station and the UE, the security parameter carried in the access response, where the air interface is securely activated after an SMC process. Security protection such as encryption is performed on data transmitted between the base station and the UE, which ensures that the base station transfers the security parameter to the UE in a secure manner.

S304: After the UE accesses the AP, the AP performs, by using the security parameter, security processing on data exchanged between the AP and the UE.

Specifically, after the UE receives the security parameter sent by the base station, both the UE and the AP have learnt the security parameter, and then, the UE accesses the AP by using the security parameter. After the UE accesses the AP, the AP performs, by using the security parameter, security processing on the data exchanged between the AP and the UE, that is, performs encryption and/or decryption processing on the data exchanged between the AP and the UE.

In the method provided in this embodiment, a base station sends, to an AP over a wired interface, a request that is used for UE to access the AP, and the AP receives the request and acquires a security parameter that is required for the UE to access the AP. Then, the AP sends the security parameter to the base station by using a response, and the base station sends the security parameter to the UE over a security air interface between the base station and the UE. After the UE accesses the AP by using the security parameter, the AP performs security processing on data exchanged between the AP and the UE, which can improve security of interaction between the UE and the AP, and ensure data communication security.

Figure 4:
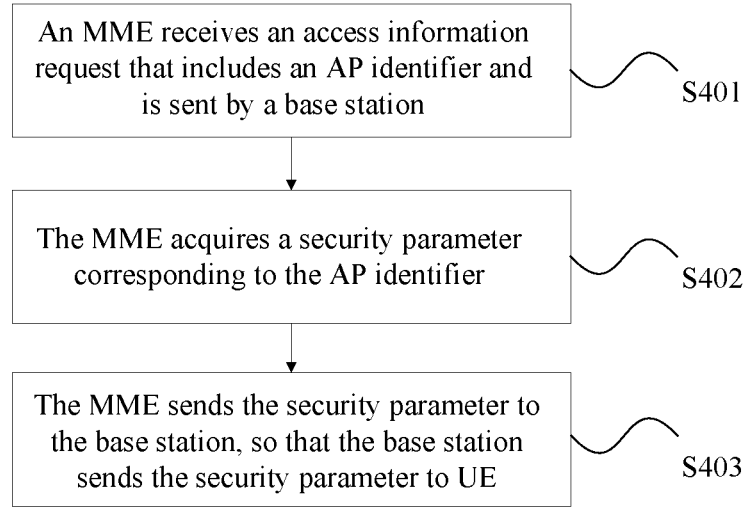
FIG. 4 is a schematic flowchart of Embodiment 4 of a communication security processing method according to the present invention.

FIG. 4 is a schematic flowchart of Embodiment 4 of a communication security processing method according to the present invention. As shown in FIG. 4, the method includes the following steps:

S401: A mobility management entity (Mobility Management Entity, MME for short) receives an access information request that includes an AP identifier and is sent by a base station.

Optionally, UE requests to access an AP, and sends the request for accessing the AP to the base station; after receiving the request that is used for the UE to access the AP, the base station sends the access request to the MME over an interface (a wired interface, for example, an optical fiber) between the base station and the MME; and the MME receives the access request.

S402: The MME acquires a security parameter corresponding to the AP identifier.

S403: The MME sends the security parameter to the base station, so that the base station sends the security parameter to UE.

Specifically, after the MME receives the request that is used for the UE to access the AP and is sent by the base station, the MME acquires the security parameter that is required for the UE to access the AP and interact with the AP, and saves the security parameter; then, the MME sends the security parameter to the base station over the interface between the base station and the MME. After receiving the security parameter sent by the MME, the base station sends the security parameter to the UE over an air interface between the base station and the UE, where the air interface is securely activated after an SMC process. Security protection such as encryption is performed on data transmitted between the base station and the UE, which ensures that the base station transfers the security parameter to the UE in a secure manner.

In one implementation scenario, the MME sends, over a wired interface (for example, an optical fiber) between the MME and the AP, the security parameter that is required for the UE to access the AP. After receiving the security parameter, the AP saves the security parameter, and sends an AP access response to the base station, where the access response carries the security parameter that is required for the UE to access the AP. Then, the UE receives the security parameter sent by the base station, and in this case, both the UE and the AP have learnt the security parameter, and then, the UE accesses the AP by using the security parameter. After the UE accesses the AP, the AP performs, by using the security parameter, security processing on data exchanged between the AP and the UE, that is, performs encryption and/or decryption processing on the data exchanged between the AP and the UE.

In the another implementation scenario, the MME sends, to the base station over the interface between the MME and the base station, the security parameter that is required for the UE to access the AP. After receiving the security parameter, the base station sends the security parameter to the AP over a wired interface between the base station and the AP. After receiving the security parameter, the AP saves the security parameter, and sends an AP access response to the base station; in this case, the AP access response does not carry the security parameter. Then, the UE receives the security parameter sent by the base station, and in this case, both the UE and the AP have learnt the security parameter, and then, the UE accesses the AP by using the security parameter. After the UE accesses the AP, the AP performs, by using the security parameter, security processing on data exchanged between the AP and the UE, that is, performs encryption and/or decryption processing on the data exchanged between the AP and the UE.

In the method provided in this embodiment, a base station sends, to an MME over a wired interface, a request that is used for UE to access an AP. The MME receives the request and acquires a security parameter that is required for the UE to access the AP, and then sends the security parameter to the base station. The base station sends the security parameter to the UE over a security air interface between the base station and the UE. On condition that the AP acquires the security parameter, after the UE accesses the AP by using the security parameter, the AP performs security processing on data exchanged between the AP and the UE, which can improve security of interaction between the UE and the AP, and ensure data communication security.

Figure 5:
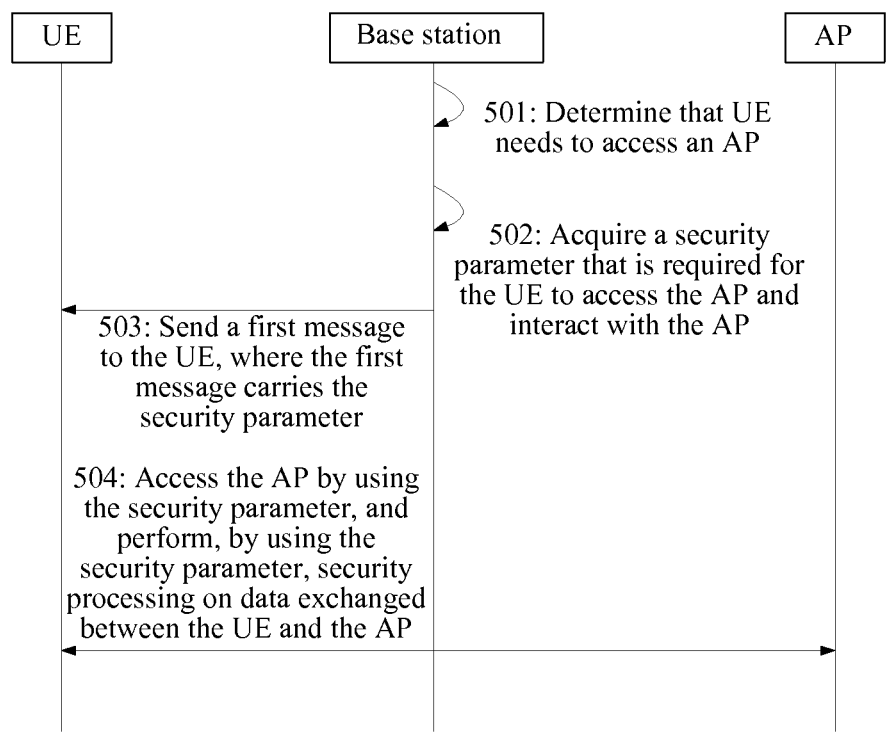
FIG. 5 is a signaling flowchart of Embodiment 5 of a communication security processing method according to the present invention.

FIG. 5 is a signaling flowchart of Embodiment 5 of a communication security processing method according to the present invention. As shown in FIG. 5, the method includes the following steps:

S501: A base station determines that UE needs to access an AP.

Optionally, that a base station determines that UE needs to access an AP may be that: the base station determines, according to a preset offloading policy, that the UE needs to access the AP, that is, the base station determines a congestion situation of a current network, and forces, according to the preset offloading policy, the UE to access the AP, so as to achieve an offloading effect and ensure quality of the current network; or may be that: the UE sends, according to a service situation of the UE, a request message for accessing the AP to the base station, and the base station determines, according to the request message, that the UE needs to access the AP.

S502: The base station acquires a security parameter that is required for the UE to access the AP and interact with the AP.

The security parameter in this embodiment may include, for example, any combination of a key, a security random number, and a security algorithm.

S503: The base station sends a first message to the UE, where the first message carries the security parameter.

Specifically, the base station acquires the security parameter that is required for the UE to access the AP and interact with the AP, where the security parameter may include any combination of a key, a security random number, and a security algorithm. After an air interface between the base station and the UE is securely activated, the base station sends the acquired security parameter to the UE by using the first message. The first message carries the security parameter, and the message may be a message used for accessing an AP, or may be an independent message. The air interface between the UE and the base station is secure, that is, the air interface is securely activated after an SMC process, and security protection such as encryption is performed on data transmitted between the base station and the UE; therefore, the security parameter for transfer is secure and encrypted, and a key or a security random number can be directly sent to the UE over the air interface between the base station and the UE.

S504: The UE accesses the AP by using the security parameter, and performs, by using the security parameter, security processing on data exchanged between the UE and the AP.

Specifically, after receiving the security parameter over the security air interface, the UE accesses the AP by using the security parameter, and performs, by using the security parameter, security processing on the data exchanged between the UE and the AP, that is, performs encryption and/or decryption processing on the data exchanged between the UE and the AP.

In the method provided in this embodiment, UE sends a request for accessing an AP to a base station; the base station receives the request, acquires a security parameter that is required for the UE to interact with the AP, and transfers the security parameter required for communication security over a security air interface between the base station and the UE. By using the acquired security parameter, the UE accesses the AP and performs security processing on data exchanged between the UE and the AP. According to the method provided in this embodiment, security of interaction between the UE and the AP is improved, and data communication security is ensured; in addition, an operator can restrict the UE to autonomously accessing the AP, that is, the UE cannot access the AP if the UE does not acquire the security parameter sent by the base station. As a result, network control performed by the operator is enhanced.

Figure 6:
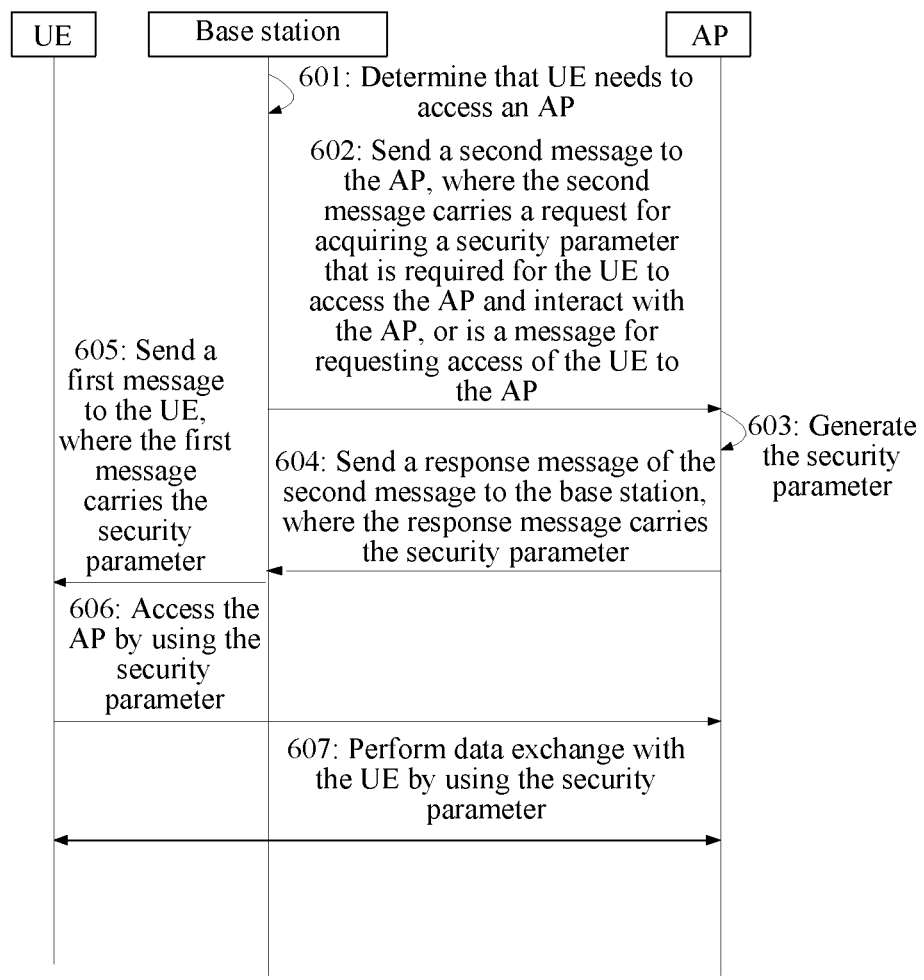
FIG. 6 is a signaling flowchart of Embodiment 6 of a communication security processing method according to the present invention.

FIG. 6 is a signaling flowchart of Embodiment 6 of a communication security processing method according to the present invention. As shown in FIG. 6, the method includes the following steps:

S601: A base station determines that UE needs to access an AP.

Optionally, that a base station determines that UE needs to access an AP may be that: the base station determines, according to a preset offloading policy, that the UE needs to access the AP, that is, the base station determines a congestion situation of a current network, and forces, according to the preset offloading policy, the UE to access the AP, so as to achieve an offloading effect and ensure quality of the current network; or may be that: the UE sends, according to a service situation of the UE, a request message for accessing the AP to the base station, and the base station determines, according to the request message, that the UE needs to access the AP.

S602: The base station sends a second message to the AP, where the second message carries a request for acquiring a security parameter that is required for the UE to access the AP and interact with the AP, or is a message for requesting access of the UE to the AP.

S603: The AP generates the security parameter.

For example, the security parameter includes any combination of a key, a security random number, and a security algorithm.

Specifically, the base station sends the second message to the AP over a wired interface (for example, an optical fiber) between the base station and the AP, where the second message carries a request for acquiring the security parameter that is required for the UE to access the AP and interact with the AP, or is a message for requesting access of the UE to the AP. After receiving the message, the AP generates the security parameter that is required for the UE to access the AP, and saves the security parameter, where the security parameter includes any combination of a key, a security random number, and a security algorithm; the key and the security random number may be randomly generated, or may be generated in another manner. The key may be UE-specific, that is, the AP can generate different keys for different UEs. Different keys can further improve security of transmission over an AP air interface.

S604: The AP sends a response message of the second message to the base station, where the response message carries the security parameter.

S605: The base station sends a first message to the UE, where the first message carries the security parameter.

S606: The UE accesses the AP by using the security parameter.

Specifically, the AP sends the response message of the second message to the base station over the wired interface between the AP and the base station, where the response message carries the security parameter. After receiving the response message, the base station sends the first message to the UE over a securely activated air interface between the base station and the UE, where the first message carries the security parameter. After receiving the security parameter, the UE accesses the AP by using the security parameter.

S607: The AP performs data exchange with the UE by using the security parameter.

Specifically, after the UE successfully accesses the AP, the AP performs, by using the saved security parameter, encryption and/or decryption processing on data communicated by the UE.

In the method provided in this embodiment, a base station sends, to an AP, a request that is used for UE to access the AP; the AP receives the request, and generates a security parameter that is required for the UE to access the AP; and the base station sends the security parameter to the UE over a security air interface between the base station and the UE. The UE accesses the AP by using the acquired security parameter, and the AP also performs, by using the security parameter, security processing on data exchanged between the AP and the UE. According to the method provided in this embodiment, security of interaction between the UE and the AP is improved, and data communication security is ensured; in addition, an operator can restrict the UE to autonomously accessing the AP, that is, the UE cannot access the AP if the UE does not acquire the security parameter sent by the base station. As a result, network control performed by the operator is enhanced.

Figure 7:
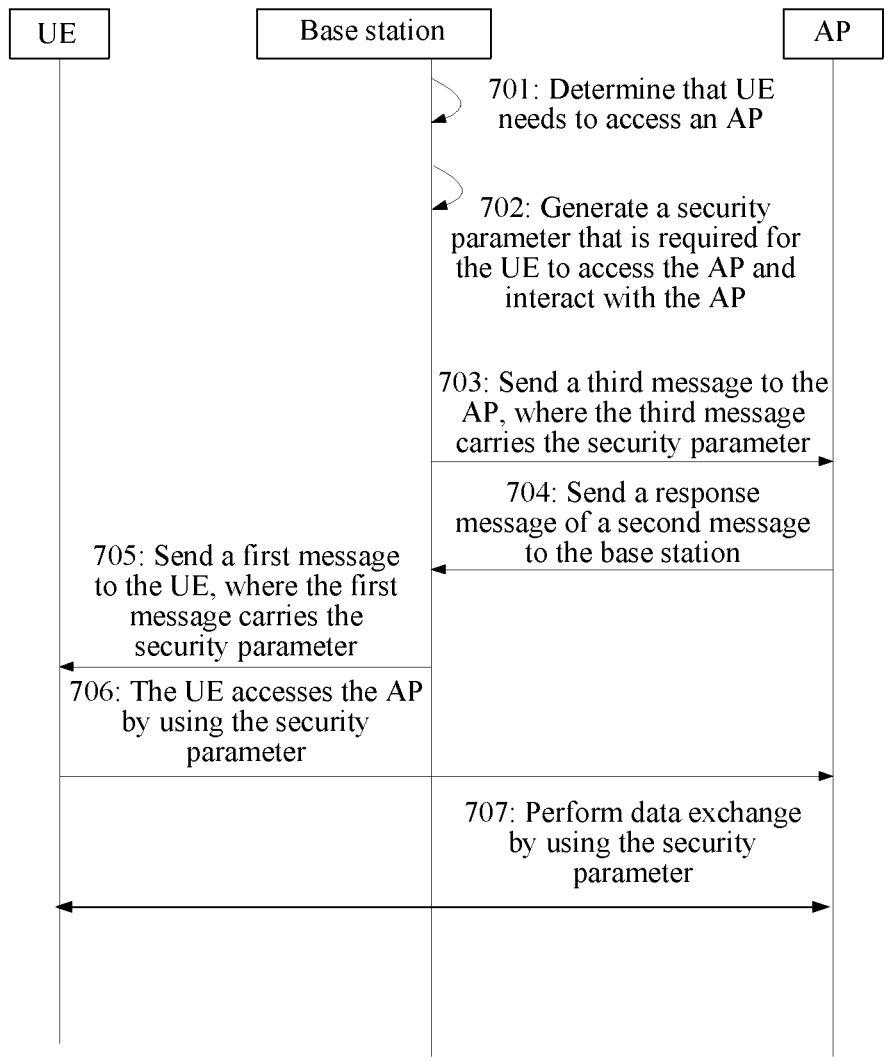
FIG. 7 is a signaling flowchart of Embodiment 7 of a communication security processing method according to the present invention.

FIG. 7 is a signaling flowchart of Embodiment 7 of a communication security processing method according to the present invention. As shown in FIG. 7, the method includes the following steps:

S701: A base station determines that UE needs to access an AP.

Optionally, that a base station determines that UE needs to access an AP may be that: the base station determines, according to a preset offloading policy, that the UE needs to access the AP, that is, the base station determines a congestion situation of a current network, and forces, according to the preset offloading policy, the UE to access the AP, so as to achieve an offloading effect and ensure quality of the current network; or may be that: the UE sends, according to a service situation of the UE, a request message for accessing the AP to the base station, and the base station determines, according to the request message, that the UE needs to access the AP.

S702: The base station generates a security parameter that is required for the UE to access the AP and interact with the AP.

The security parameter may include any combination of a key, a security random number, and a security algorithm.

S703: The base station sends a third message to the AP, where the third message carries the security parameter.

S704: The AP sends a response message of the third message to the base station.

Specifically, the base station generates the security parameter that is required for the UE to access the AP and interact with the AP, where the security parameter includes any combination of a key, a security random number, and a security algorithm; the key and the security random number may be randomly generated, or may be generated in another manner. The key may be UE-specific, that is, the AP can generate different keys for different UEs. Different keys can further improve security of transmission over an AP air interface.

Then, the base station sends the third message to the AP over a wired interface (for example, an optical fiber) between the base station and the AP, where the third message carries the security parameter, and the third message may also be a message for requesting access of the UE to the AP. After receiving the third message, the AP saves the security parameter carried in the third message.

After receiving the security parameter sent by the base station, the AP sends the response message of the third message to the base station over the wired interface between the AP and the base station, where the access response does not include the security parameter.

S705: The base station sends a first message to the UE, where the first message carries the security parameter.

S706: The UE accesses the AP by using the security parameter.

Specifically, after generating the security parameter, the base station sends the first message to the UE over an activated security air interface (the air interface is securely activated after an SMC process, and security protection such as encryption is performed on data transmitted between the base station and the UE) between the base station and the UE, where the first message carries the security parameter. After receiving the security parameter, the UE accesses the AP by using the security parameter.

S707: The AP performs data exchange with the UE by using the security parameter.

Specifically, after the UE successfully accesses the AP, the AP performs, by using the saved security parameter, encryption and/or decryption processing on data communicated by the UE.

In the method provided in this embodiment, a base station generates a security parameter that is required for UE to access an AP and interact with the AP, and separately sends the security parameter to the UE and the AP by using a message, so that the UE can perform data exchange with the AP by using the security parameter; in addition, the base station sends the security parameter to the UE over an activated security air interface between the base station and the UE, thereby ensuring confidentiality of the security parameter. According to the method provided in this embodiment, security of interaction between the UE and the AP is improved, and data communication security is ensured; in addition, an operator can restrict the UE to autonomously accessing the AP, that is, the UE cannot access the AP if the UE does not acquire the security parameter sent by the base station. As a result, network control performed by the operator is enhanced.

Figure 8:
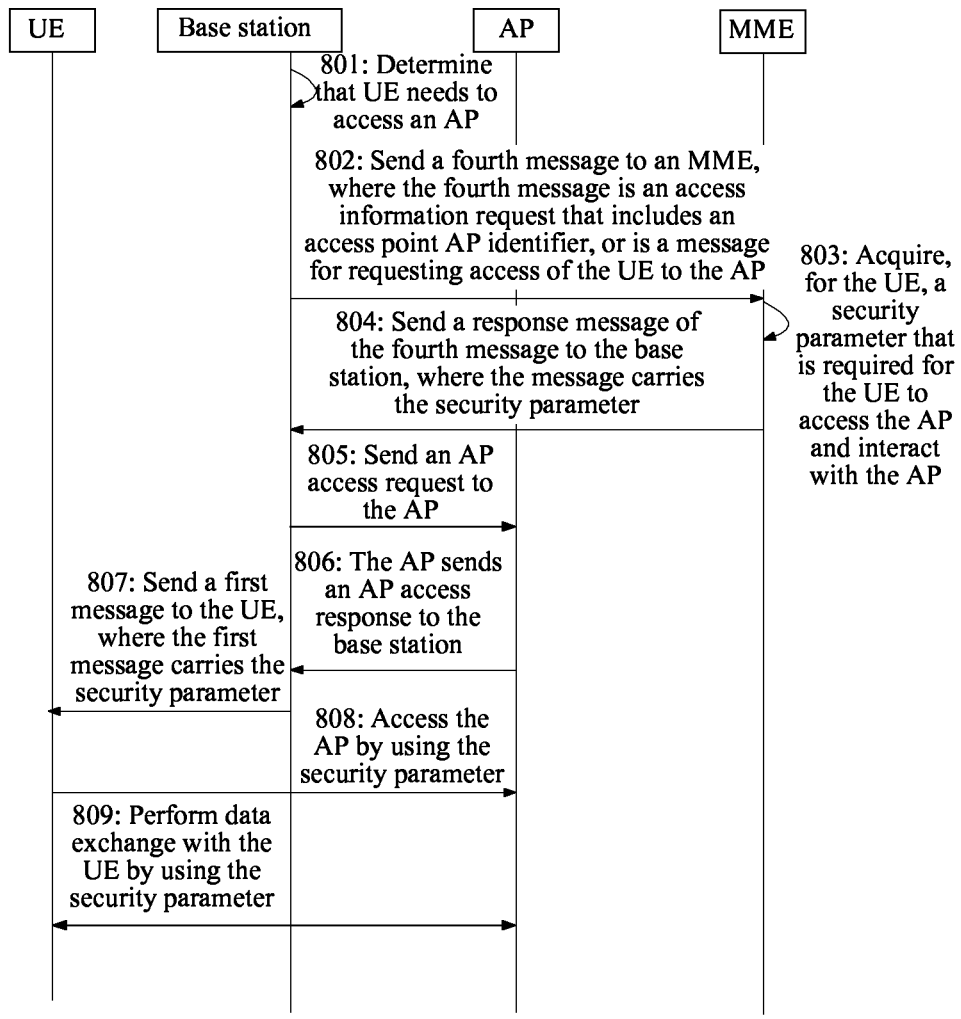
FIG. 8 is a signaling flowchart of Embodiment 8 of a communication security processing method according to the present invention.

FIG. 8 is a signaling flowchart of Embodiment 8 of a communication security processing method according to the present invention. As shown in FIG. 8, the method includes the following steps:

S801: A base station determines that UE needs to access an AP.

Optionally, that a base station determines that UE needs to access an AP may be that: the base station determines, according to a preset offloading policy, that the UE needs to access the AP, that is, the base station determines a congestion situation of a current network, and forces, according to the preset offloading policy, the UE to access the AP, so as to achieve an offloading effect and ensure quality of the current network; or may be that: the UE sends, according to a service situation of the UE, a request message for accessing the AP to the base station, and the base station determines, according to the request message, that the UE needs to access the AP.

S802: The base station sends a fourth message to an MME, where the fourth message is an access information request that includes an access point AP identifier, or is a message for requesting access of the UE to the AP.

S803: The MME acquires, for the UE, a security parameter that is required for the UE to access the AP and interact with the AP.

The security parameter may include any combination of a key, a security random number, and a security algorithm.

Specifically, the base station sends the fourth message to the MME over a wired interface (for example, an optical fiber) between the base station and the MME, where the fourth message is an access information request that includes an access point AP identifier, or is a message for requesting access of the UE to the AP. After receiving the message, the MME acquires the security parameter that is required for the UE to access the AP, and saves the security parameter, where the security parameter includes any combination of a key, a security random number, and a security algorithm; the key and the security random number may be randomly generated, or may be generated in another manner. The key may be UE-specific, that is, the AP can generate different keys for different UEs. Different keys can further improve security of transmission over an AP air interface.

Further, after receiving the message, the MME acquires the security parameter that is required for the UE to access the AP, which may be that the MME generates the security parameter, or may be that the MME acquires the security parameter from a home subscriber server (Home Subscriber Server, HSS for short) network element according to the AP identifier included in the fourth message. The AP identifier included in the fourth message may be a Media Access Control (Media Access Control, MAC for short) address of the AP, or a service set identifier (Service Set identifier, SSID for short).

S804: The MME sends a response message of the fourth message to the base station, where the message carries the security parameter.

S805: The base station sends an AP access request to the AP.

S806: The AP sends an AP access response to the base station.

Specifically, after acquiring the security parameter, the MME sends the response message of the fourth message to the base station over the wired interface between the MME and the base station, where the message carries the security parameter. Optionally, after acquiring the security parameter, the MME may send the security parameter to the base station by adding the security parameter to the response message of the fourth message. After receiving the response message, the base station sends the AP access request to the AP, and sends the security parameter in the response message to the AP over a wired interface between the base station and the AP; or after acquiring the security parameter, the MME directly sends the security parameter to the AP over a wired interface between the MME and the AP. Then, the AP sends the AP access response to the base station, where the access response carries the security parameter.

S807: The base station sends a first message to the UE, where the first message carries the security parameter.

S808: The UE accesses the AP by using the security parameter.

Specifically, after acquiring the security parameter, the base station sends the first message to the UE over an activated security air interface between the base station and the UE, where the first message carries the security parameter. After receiving the security parameter, the UE accesses the AP by using the security parameter.

S809: The AP performs data exchange with the UE by using the security parameter.

Specifically, after the UE successfully accesses the AP, the AP performs, by using the saved security parameter, encryption and/or decryption processing on data communicated by the UE.

In the method provided in this embodiment, an MME acquires a security parameter that is required for UE to access an AP and interact with the AP, and sends the security parameter to a base station, and the base station sends the security parameter to the UE over an activated security air interface between the base station and the UE, so that the UE can perform data exchange with the AP by using the security parameter; in addition, the base station sends the security parameter to the UE over the activated security air interface between the base station and the UE, and therefore confidentiality of the security parameter is ensured. According to the method provided in this embodiment, security of interaction between the UE and the AP is improved, and data communication security is ensured; in addition, an operator can restrict the UE to autonomously accessing the AP, that is, the UE cannot access the AP if the UE does not acquire the security parameter sent by the base station. As a result, network control performed by the operator is enhanced.

A person of ordinary skill in the art may understand that all or a part of the steps in the foregoing method embodiments can be implemented by a program instructing relevant hardware. The program may be stored in a computer readable storage medium and when the program runs, the steps in the foregoing method embodiments are performed. The storage medium includes any medium that can store program code, such as a ROM, a RAM, a magnetic disk, or an optical disc.

Figure 9:
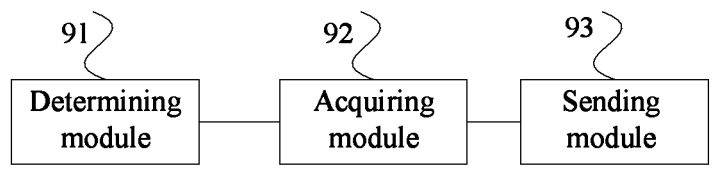
FIG. 9 is a schematic structural diagram of Embodiment 1 of a base station according to the present invention.

FIG. 9 is a schematic structural diagram of Embodiment 1 of a base station according to the present invention. As shown in FIG. 9, the base station may include a determining module 91, an acquiring module 92, and a sending module 93, where the determining module 91 is configured to determine that UE needs to access an AP; the acquiring module 92 is configured to acquire a security parameter that is required for the UE to interact with the AP; and the sending module 93 is configured to: after an air interface is securely activated, send the security parameter to the UE, so that the UE performs, by using the security parameter, security processing on data exchanged between the UE and the AP.

The base station in this embodiment can implement the method embodiment shown in FIG. 1. Implementation principles and technical effects thereof are similar, and details are not described herein again.

Figure 10:
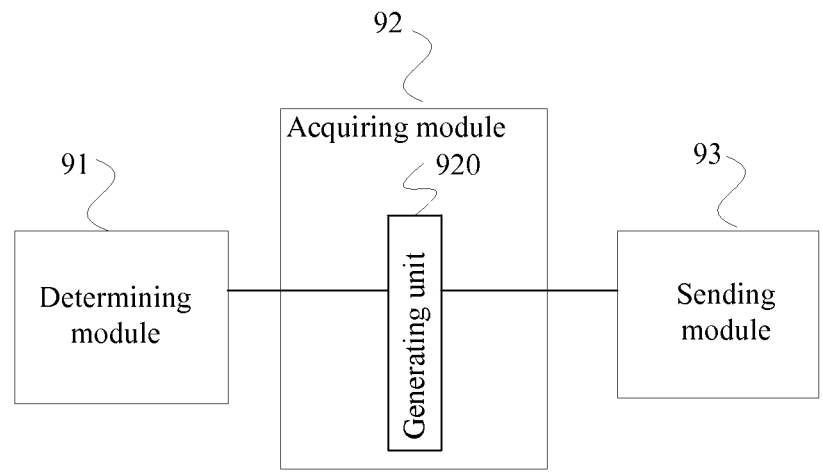
FIG. 10 is a schematic structural diagram of Embodiment 2 of a base station according to the present invention.

FIG. 10 is a schematic structural diagram of Embodiment 2 of a base station according to the present invention. Based on the embodiment shown in FIG. 9, further, the foregoing determining module 91 is specifically configured to determine, according to a preset offloading policy, that the UE needs to access the AP, or determine, according to a request message that is for accessing the AP and is sent by the UE, that the UE needs to access the AP. The foregoing acquiring module 92 may include a generating unit 920. The generating unit 920 is configured to generate the security parameter. The sending module 93 is further configured to send the security parameter to the AP.

The base station in this embodiment can implement the method embodiments shown in FIG. 5 to FIG. 8. Implementation principles and technical effects thereof are similar, and details are not described herein again.

Figure 11:
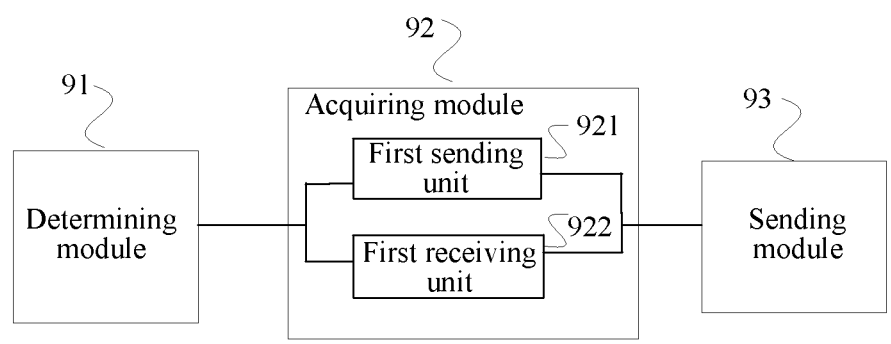
FIG. 11 is a schematic structural diagram of Embodiment 3 of a base station according to the present invention.

FIG. 11 is a schematic structural diagram of Embodiment 3 of a base station according to the present invention. Based on the embodiment shown in FIG. 9, further, the acquiring module 92 may include a first sending unit 921 and a first receiving unit 922. The first sending unit 921 is configured to send an access request to the AP; and the first receiving unit 922 is configured to receive an access response that includes the security parameter generated by the AP and is sent by the AP.

The base station in this embodiment can implement the method embodiments shown in FIG. 5 to FIG. 8. Implementation principles and technical effects thereof are similar, and details are not described herein again.

Figure 12:
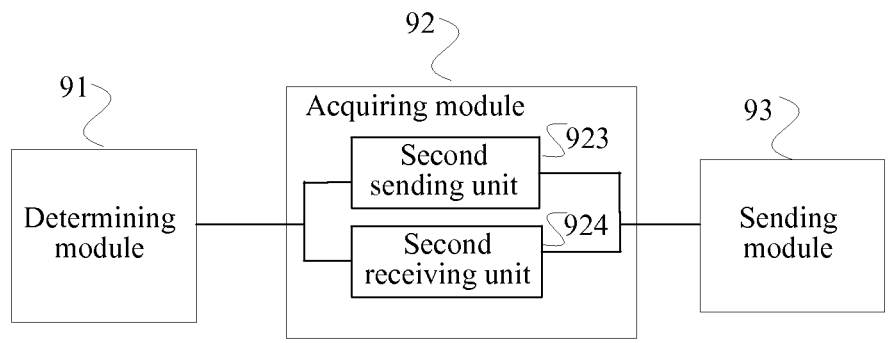
FIG. 12 is a schematic structural diagram of Embodiment 4 of a base station according to the present invention.

FIG. 12 is a schematic structural diagram of Embodiment 4 of a base station according to the present invention. Based on the embodiment shown in FIG. 9, further, the acquiring module 92 may include a second sending unit 923 and a second receiving unit 924, where the second sending unit 923 is configured to send an access information request that includes an AP identifier to a mobility management entity MME; and the second receiving unit 924 is configured to receive the security parameter that is corresponding to the foregoing AP identifier and is sent by the foregoing MME. Accordingly, the sending module 93 is further configured to send the foregoing security parameter to the foregoing AP. The foregoing security parameter may include any combination of a key, a security random number, and a security algorithm.

The base station in this embodiment can implement the method embodiments shown in FIG. 5 to FIG. 8. Implementation principles and technical effects thereof are similar, and details are not described herein again.

Figure 13:
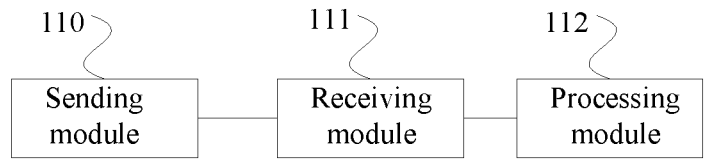
FIG. 13 is a schematic structural diagram of Embodiment 1 of UE according to the present invention.

FIG. 13 is a schematic structural diagram of Embodiment 1 of UE according to the present invention. As shown in FIG. 13, the apparatus includes a receiving module 111 and a processing module 112, where the receiving module 111 is configured to receive a security parameter that is required for the UE to interact with an AP and is sent by a base station after an air interface is securely activated; and the processing module 112 is configured to perform, by using the security parameter, security processing on data exchanged between the UE and the AP.

The UE in this embodiment can implement the method embodiment shown in FIG. 2. Implementation principles and technical effects thereof are similar, and details are not described herein again.

Further, based on the embodiment shown in FIG. 13, the apparatus further includes a sending module 110, which is configured to: before the security parameter that is required for the UE to interact with the AP and is sent by the base station after the air interface is securely activated is received, send a request message for accessing the AP to the base station, so that the base station determines, according to the request message, that the UE needs to access the AP. The security parameter includes any combination of a key, a security random number, and a security algorithm.

The UE in this embodiment can implement the method embodiments shown in FIG. 5 to FIG. 8. Implementation principles and technical effects thereof are similar, and details are not described herein again.

Figure 14:
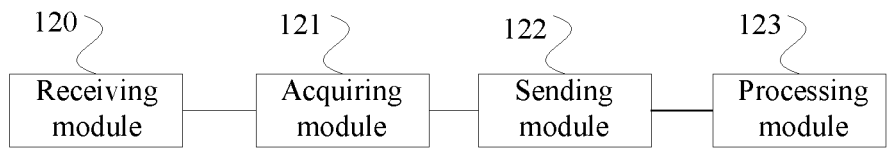
FIG. 14 is a schematic structural diagram of Embodiment 1 of an AP according to the present invention.

FIG. 14 is a schematic structural diagram of Embodiment 1 of an AP according to the present invention. As shown in FIG. 14, the apparatus includes a receiving module 120, an acquiring module 121, a sending module 122, and a processing module 123, where the receiving module 120 is configured to receive an access request that is used for UE to access the AP and is sent by a base station; the acquiring module 121 is configured to acquire a security parameter that is required for the AP to interact with the UE; the sending module 122 is configured to send an AP access response to the base station; and the processing module 123 is configured to: after the UE accesses the AP, perform, by using the security parameter, security processing on data exchanged between the AP and the UE.

The AP in this embodiment can implement the method embodiment shown in FIG. 3. Implementation principles and technical effects thereof are similar, and details are not described herein again.

Further, the foregoing acquiring module 121 is specifically configured to generate the security parameter, or receive, by the AP, the security parameter sent by a mobility management entity MME; and further configured to receive the security parameter sent by the base station. The foregoing sending module 122 is specifically configured to send the AP access response that includes the security parameter. The security parameter includes any combination of a key, a security random number, and a security algorithm.

The AP in this embodiment can implement the method embodiments shown in FIG. 5 to FIG. 8. Implementation principles and technical effects thereof are similar, and details are not described herein again.

Figure 15:
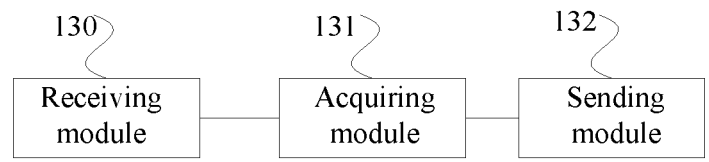
FIG. 15 is a schematic structural diagram of Embodiment 1 of an MME according to the present invention.

FIG. 15 is a schematic structural diagram of Embodiment 1 of an MME according to the present invention. As shown in FIG. 15, the apparatus includes a receiving module 130, an acquiring module 131, and a sending module 132, where the receiving module 130 is configured to receive an access information request that includes an AP identifier and is sent by a base station; the acquiring module 131 is configured to acquire a security parameter corresponding to the AP identifier; and the sending module 132 is configured to send the security parameter to the base station, so that the base station sends the security parameter to UE.

The MME in this embodiment can implement the method embodiment shown in FIG. 4. Implementation principles and technical effects thereof are similar, and details are not described herein again.

Further, the foregoing acquiring module 131 is specifically configured to acquire, from a home subscriber server HSS, the security parameter corresponding to the AP identifier, or the MME is configured to generate the security parameter corresponding to the AP identifier. The foregoing sending module is further specifically configured to send the security parameter to the AP. The security parameter includes any combination of a key, a security random number, and a security algorithm.

The MME in this embodiment can implement the method embodiments shown in FIG. 5 to FIG. 8. Implementation principles and technical effects thereof are similar, and details are not described herein again.

Figure 16:
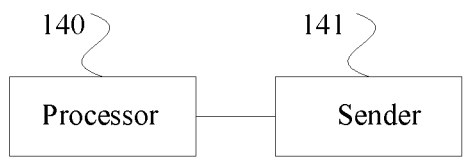
FIG. 16 is a schematic structural diagram of Embodiment 5 of a base station according to the present invention.

FIG. 16 is a schematic structural diagram of Embodiment 5 of a base station according to the present invention. As shown in FIG. 16, the apparatus includes a processor 140 and a transmitter 141, where the processor 140 is configured to determine that UE needs to access an AP, and is further configured to acquire a security parameter that is required for the UE to interact with the AP; and the transmitter 141 is configured to: after an air interface is securely activated, send the security parameter to the UE, so that the UE performs, by using the security parameter, security processing on data exchanged between the UE and the AP.

The base station in this embodiment can implement the method embodiment shown in FIG. 1. Implementation principles and technical effects thereof are similar, and details are not described herein again.

Further, the foregoing processor 140 is specifically configured to determine, according to a preset offloading policy, that the UE needs to access the AP, or determine, according to a request message that is for accessing the AP and is sent by the UE, that the UE needs to access the AP; further configured to generate the security parameter; further configured to send an access request to the AP and receive an access response that includes the security parameter generated by the AP and is sent by the AP; and further specifically configured to send an access information request that includes an AP identifier to an MME and receive the security parameter that is corresponding to the AP identifier and is sent by the MME. The foregoing transmitter 141 is further specifically configured to send the security parameter to the foregoing AP, where the security parameter includes any combination of a key, a security random number, and a security algorithm.

The base station in this embodiment can implement the method embodiments shown in FIG. 5 to FIG. 8. Implementation principles and technical effects thereof are similar, and details are not described herein again.

Figure 17:
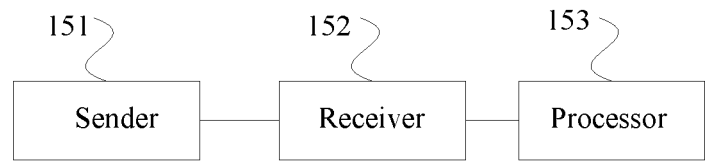
FIG. 17 is a schematic structural diagram of Embodiment 2 of UE according to the present invention.

FIG. 17 is a schematic structural diagram of Embodiment 2 of UE according to the present invention. As shown in FIG. 17, the apparatus includes a receiver 152 and a processor 153, where the receiver 152 is configured to receive a security parameter that is required for the UE to interact with an AP and is sent by a base station after an air interface is securely activated; and the processor 153 is configured to perform, by using the security parameter, security processing on data exchanged between the UE and the AP.

The UE in this embodiment can implement the method embodiment shown in FIG. 2. Implementation principles and technical effects thereof are similar, and details are not described herein again.

Further, based on the embodiment shown in FIG. 17, the apparatus further includes a transmitter 151, which is configured to: before the security parameter that is required for the UE to interact with the AP and is sent by the base station after the air interface is securely activated is received, send a request message for accessing the AP to the base station, so that the base station determines, according to the request message, that the UE needs to access the AP. The security parameter includes any combination of a key, a security random number, and a security algorithm.

The UE in this embodiment can implement the method embodiments shown in FIG. 5 to FIG. 8. Implementation principles and technical effects thereof are similar, and details are not described herein again.

Figure 18:
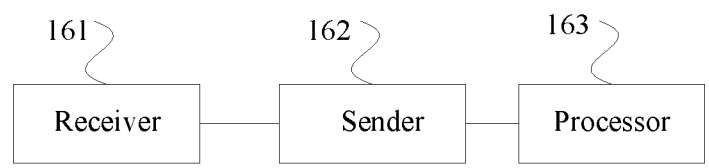
FIG. 18 is a schematic structural diagram of Embodiment 2 of an AP according to the present invention.

FIG. 18 is a schematic structural diagram of Embodiment 2 of an AP according to the present invention. As shown in FIG. 18, the apparatus includes a receiver 161, a transmitter 162, and a processor 163, where the receiver 161 is configured to receive an access request that is used for UE to access the AP and is sent by a base station; the transmitter 162 is configured to send an AP access response to the base station; and the processor 163 is configured to acquire a security parameter that is required for the AP to interact with the UE, and further configured to: after the UE accesses the AP, perform, by using the security parameter, security processing on data exchanged between the AP and the UE.

The AP in this embodiment can implement the method embodiment shown in FIG. 3. Implementation principles and technical effects thereof are similar, and details are not described herein again.

Further, the foregoing processor 163 is specifically configured to generate the security parameter, or receive, by the AP, the security parameter sent by an MME; and further configured to receive the security parameter sent by the base station. The foregoing transmitter 162 is specifically configured to send the AP access response that includes the security parameter. The security parameter includes any combination of a key, a security random number, and a security algorithm.

The AP in this embodiment can implement the method embodiments shown in FIG. 5 to FIG. 8. Implementation principles and technical effects thereof are similar, and details are not described herein again.

Figure 19:
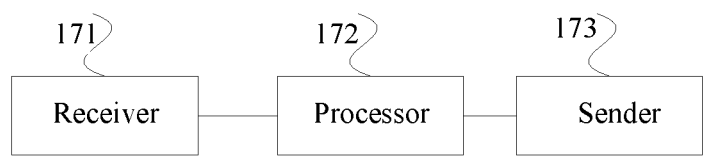
FIG. 19 is a schematic structural diagram of Embodiment 2 of an MME according to the present invention.

FIG. 19 is a schematic structural diagram of Embodiment 2 of an MME according to the present invention. As shown in FIG. 19, the apparatus includes a receiver 171, a processor 172, and a transmitter 173, where the receiver 171 is configured to receive an access information request that includes an access point AP identifier and is sent by a base station; the processor 172 is configured to acquire a security parameter corresponding to the AP identifier; and the transmitter 173 is configured to send the security parameter to the base station, so that the base station sends the security parameter to UE.

The MME in this embodiment can implement the method embodiment shown in FIG. 4. Implementation principles and technical effects thereof are similar, and details are not described herein again.

Further, the foregoing processor 172 is specifically configured to acquire, from a home subscriber server HSS, the security parameter corresponding to the AP identifier, or the MME is configured to generate the security parameter corresponding to the AP identifier. The foregoing transmitter is further specifically configured to send the security parameter to the AP. The security parameter includes any combination of a key, a security random number, and a security algorithm.

The MME in this embodiment can implement the method embodiments shown in FIG. 5 to FIG. 8. Implementation principles and technical effects thereof are similar, and details are not described herein again.

Finally, it should be noted that the foregoing embodiments are merely intended for describing the technical solutions of the present invention, but not for limiting the present invention. Although the present invention is described in detail with reference to the foregoing embodiments, a person of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A communication security processing method, comprising:

determining, by a base station, that user equipment (UE) needs to access an access point (AP) according to an offloading policy;
acquiring, by the base station, a security parameter that is required for the UE to interact with the AP in response to the determining that the UE needs to access the AP according to the offloading policy; and
after an air interface is securely activated, sending, by the base station, the security parameter to the UE, so that the UE performs, by using the security parameter, security processing on data exchanged between the UE and the AP
wherein:
the acquiring, by the base station, the security parameter comprises:
sending, by the base station, an access information request that comprises an AP identifier, to a mobility management entity (MME) in response to the determining that the UE needs to access the AP according to the offloading policy; and
receiving, by the base station from the AP corresponding to the AP identifier, an AP access response comprising the security parameter corresponding to the AP identifier, in response to the MME sending the security parameter to the AP corresponding to the AP identifier to cause the AP send the AP access response to the base station.

2. The method according to claim 1, wherein the determining, by the base station, that the UE needs to access the AP comprises:
receiving, by the base station from the UE, a request message requesting access to the AP, and determining, according to the request message, that the UE needs to access the AP.

3. The method according to claim 1, wherein the acquiring, by the base station, the security parameter comprises:
acquiring, by the base station from the MME, the security parameter, and
sending, by the base station, the security parameter to the AP to cause the AP to send an AP access response to the base station.

4. The communication security processing method according to claim 1, wherein the determining that the UE needs to access the AP according to the offloading policy comprises determining, by the base station, that a current network experiences a congestion situation.

5. A communication security processing method, comprising:
acquiring, by a user equipment (UE) over a secured air interface, a security parameter that is required for the UE to interact with an access point (AP) and is sent by a base station in response to the base station determining that the UE needs to access the AP according to an offloading policy and after the secured air interface is activated; and
performing, by the UE by using the security parameter, security processing on data exchanged between the UE and the AP;
wherein the security parameter acquired by the UE through the base station is sent from a mobility management entity (MME) to the base station in response to the MME sending the security parameter to the AP corresponding to an AP identifier sent by the base station to the MME, to cause the AP to send an AP access response including the security parameter to the base station to cause the base station to send the security parameter to the UE.

6. The method according to claim 5, further comprising, before the receiving the security parameter, sending, by the UE, a request message for accessing the AP to the base station used by the base station for the determining that the UE needs to access the AP.

7. A communication security processing method, comprising:
acquiring, by an access point (AP) from a base station in response to the base station determining that a user equipment (UE) needs to access the AP according to an offloading policy, an access request that is used for the UE to access the AP;
acquiring, by the AP, a security parameter that is required for the AP to interact with the UE;
sending, by the AP, an AP access response to the base station wherein the AP access response comprising the security parameter which is sent by the base station to the UE after an air interface is securely activated,
wherein the acquiring, by the AP, the security parameter, comprises acquiring from a mobility management entity (MME) the security parameter corresponding to an AP identifier corresponding to the AP to send the AP access response comprising the security parameter to the base station; and
after the UE accesses the AP, performing, by the AP by using the security parameter, security processing on data exchanged between the AP and the UE.

8. A communication security processing method, comprising:
receiving, by a mobility management entity (MME) from a base station, an access information request that comprises an access point (AP) identifier corresponding to an AP, the access information request sent by the base station in response to the base station determining that a user equipment (UE) needs to access the AP according to an offloading policy;
acquiring, by the MME, a security parameter corresponding to the AP identifier; and
sending, by the MME, the security parameter to the AP to cause the AP send an AP access response including the security parameter to the base station, to cause the base station to send the security parameter to the UE after an air interface is securely activated,
wherein the security parameter is used for the UE to perform security processing on data exchanged between the UE and the AP.

9. The method according to claim 8, wherein the acquiring, by the MME, the security parameter corresponding to the AP identifier comprises:
acquiring, by the MME from a home subscriber server (HSS), the security parameter corresponding to the AP identifier; or
generating, by the MME, the security parameter corresponding to the AP identifier; and
the method further comprises:
upon the MME generating the security parameter, sending, by the MME, the security parameter to the access point AP.

10. A base station, comprising:
at least one hardware processor;
a memory interfaced to the at least one hardware processor, the memory including instructions executable by the at least one hardware processor to control the at least one hardware processor to:
determine that user equipment (UE) needs to access an access point (AP) according to an offloading policy;

acquire a security parameter that is required for the UE to interact with the AP in response to the UE being determined to need to access the AP according to the offloading policy; and after an air interface is securely activated, send the security parameter to the UE, so that the UE performs, by using the security parameter, security processing on data exchanged between the UE and the AP;

wherein:

to acquire the security parameter the instructions further control the at least one hardware processor to:

send an access information request that comprises an AP identifier to a mobility management entity (MME) in response to the determining that the UE needs to access the AP according to the offloading policy; and receive, from the AP corresponding to the AP identifier, an AP access response comprising the security parameter corresponding to the AP identifier, in response to the MME sending the security parameter to the AP corresponding to the AP identifier to cause the AP send the AP access response to the base station.

11. The base station according to claim 10, wherein the instructions further control the at least one hardware processor to:

determine, according to a request message that is for accessing the AP and is sent by the UE, that the UE needs to access the AP.

12. The base station according to claim 10, wherein to acquire the security parameter, the instructions further control the at least one hardware processor to, acquire, from the MME, the security parameter, and send the security parameter to the AP to cause the AP to send an PA access response to the base station.

13. A user equipment (UE), comprising:

at least one hardware processor;

a memory interfaced to the at least one hardware processor, the memory including instructions executable by the at least one hardware processor to control the at least one hardware processor to:

acquire, over a secured air interface, a security parameter that is required for the UE to interact with an access point AP and is sent by a base station in response to the base station determining that the UE needs to access the AP according to an offloading policy and after the secured air interface is activated; and perform, by using the security parameter, security processing on data exchanged between the UE and the AP;

wherein the security parameter acquired by the UE through the base station is sent from a mobility management entity (MME) to the base station in response to the MME sending the security parameter to the AP corresponding to an AP identifier sent by the base station to the MME, to cause the AP to send an AP access response including the security parameter to the base station to cause the base station to send the security parameter to the UE.

14. The UE according to claim 13, wherein the instructions further control the at least one hardware processor to, before the security parameter sent by the base station is received and after the air interface is securely activated, send a request message for accessing the AP to the base station used by the base station for determining that the UE needs to access the AP.

15. An access point (AP), comprising:

at least one hardware processor;

a memory interfaced to the at least one hardware processor, the memory including instructions executable by the at least one hardware processor to control the at least one hardware processor to:

acquire, from a base station in response to the base station determining that a user equipment (UE) needs to access the AP according to an offloading policy, an access request that is used for user equipment (UE) to access the AP and is sent by a base station;

acquire a security parameter that is required for the AP to interact with the UE;

send an AP access response to the base station wherein the AP access response comprising the security parameter which is sent by the base station to the UE after an air interface is securely activated, wherein the security parameter is acquired from a mobility management entity (MME) the security parameter corresponding to an AP identifier corresponding to the AP to send the AP access response comprising the security parameter to the base station; and after the UE accesses the AP, perform, by using the security parameter, security processing on data exchanged between the AP and the UE.

16. A mobility management entity (MME), comprising:

at least one hardware processor;

a memory interfaced to the at least one hardware processor, the memory including instructions executable by the at least one hardware processor to control the at least one hardware processor to:

receive, from a base station, an access information request that comprises an access point (AP) identifier corresponding to an AP, the access information request sent by the base station in response to the base station determining that a user equipment (UE) needs to access the AP according to an offloading policy;

acquire a security parameter corresponding to the AP identifier; and send the security parameter to the AP to cause the AP send an AP access response including the security parameter to the base station, to cause the base station to send the security parameter to the UE after an air interface is securely activated, wherein the security parameter is used for the UE to perform security processing on data exchanged between the UE and the AP.

17. The MME according to claim 16, wherein the instructions further control the at least one hardware processor to acquire, from a home subscriber server (HSS), the security parameter corresponding to the AP identifier, or is configured to generate the security parameter corresponding to the AP identifier; and the instructions further control the at least one hardware processor to send the security parameter to the access point AP.

* * * * *

UNITED STATES PATENT AND TRADEMARK OFFICE
CERTIFICATE OF CORRECTION

PATENT NO. : 10,172,003 B2
APPLICATION NO. : 14/743193
DATED : January 1, 2019
INVENTOR(S) : Hongping Zhang et al.

It is certified that error appears in the above-identified patent and that said Letters Patent is hereby corrected as shown below:

In the Claims

In Column 21, Line 37:
In Claim 12, delete "PA" and insert -- AP --, therefor.

Signed and Sealed this
Fifteenth Day of October, 2019

Andrei Iancu
*Director of the United States Patent and Trademark Office*